United States Patent
Kim et al.

(10) Patent No.: US 9,992,724 B2
(45) Date of Patent: Jun. 5, 2018

(54) CELL SELECTION AND RESELECTION USING A VEHICLE ANTENNA

(71) Applicant: General Motors LLC, Detroit, MI (US)

(72) Inventors: Chong In Kim, Troy, MI (US); David George, Farmington Hills, MI (US); Scott T. Droste, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 0 days. days.

(21) Appl. No.: 15/170,591

(22) Filed: Jun. 1, 2016

(65) Prior Publication Data

US 2017/0353904 A1    Dec. 7, 2017

(51) Int. Cl.
| | |
|---|---|
| *H04W 36/00* | (2009.01) |
| *H04W 36/30* | (2009.01) |
| *H04B 17/318* | (2015.01) |
| *H04B 17/382* | (2015.01) |
| *H04L 5/00* | (2006.01) |

(52) U.S. Cl.
CPC .......... *H04W 36/30* (2013.01); *H04B 17/318* (2015.01); *H04B 17/382* (2015.01); *H04L 5/0048* (2013.01)

(58) Field of Classification Search
CPC ..... H04W 48/20; H04W 36/30; H04W 24/10; H04W 36/0083; H04W 88/06
USPC .......................... 455/436–444; 370/321–334
See application file for complete search history.

(56) References Cited

U.S. PATENT DOCUMENTS

| | | | |
|---|---|---|---|
| 2007/0185624 A1* | 8/2007 | Duddles .................. | G06F 8/665 701/1 |
| 2007/0223510 A1* | 9/2007 | Joo .................... | H04W 36/0088 370/436 |
| 2012/0238272 A1* | 9/2012 | Hwang ............... | H04W 36/245 455/436 |
| 2014/0036874 A1 | 2/2014 | Jeong et al. | |

FOREIGN PATENT DOCUMENTS

WO    WO2014021661 A1    2/2014

* cited by examiner

*Primary Examiner* — Ronald Eisner
(74) *Attorney, Agent, or Firm* — David Willoughby; Reising Ethington P.C.

(57) ABSTRACT

A mobile vehicle communications system adapted to perform a method of cellular reselection using vehicle telematics unit coupled to a vehicle antenna. The method includes: performing a measurement of a reference signal from a serving cell that is connected to the telematics unit; determining whether to perform a measurement of a target cell based on both a serving cell signal strength value (Srxlev) and a measured serving cell signal quality value (Qqualmeas); and when the measurement of the target cell is performed, then determining whether to reselect to the target cell based on cell selection values of the serving and target cells.

8 Claims, 5 Drawing Sheets

CELL SELECTION AND RESELECTION USING A VEHICLE ANTENNA

TECHNICAL FIELD

The present invention relates to cell selection and reselection using a vehicle antenna.

BACKGROUND

Figure 1:
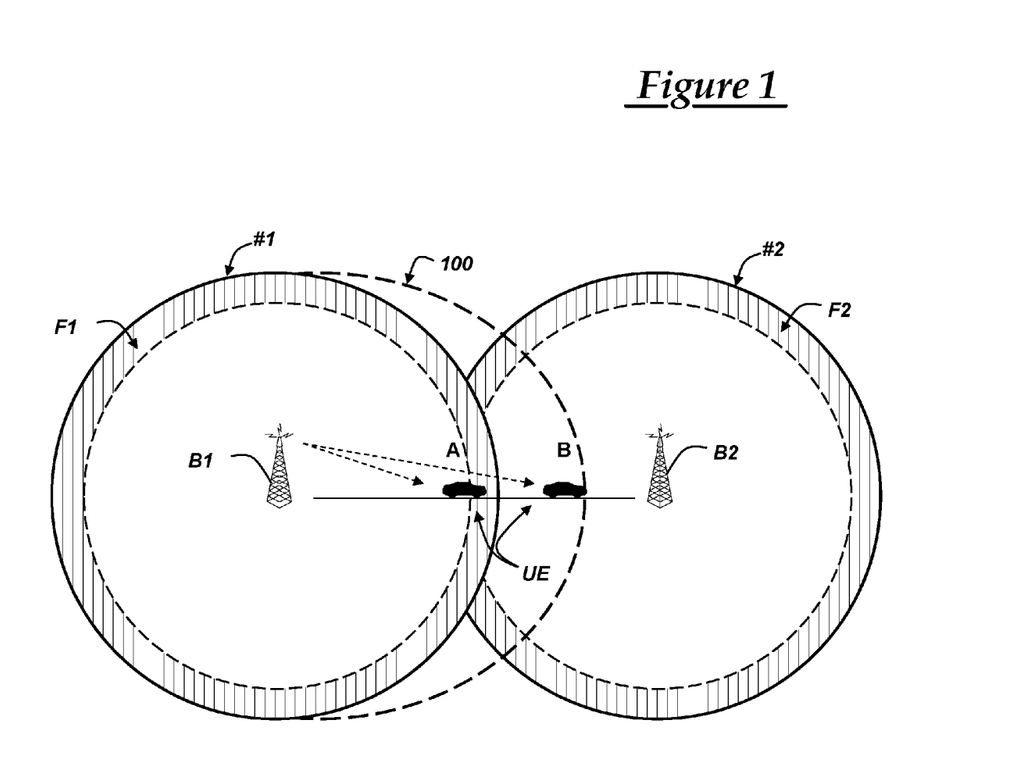
FIG. 1 is a schematic diagram depicting cellular dragging.

In mobile telecommunications, when user equipment (UE) is connected to a particular cell, a circumstance commonly known as cell or cellular dragging may occur. An example of cell dragging 100 is illustrated in FIG. 1 where a UE in position A—within a fringe area F1 of Cell#1—maintains a connection with Cell#1 even while the UE moves to position B—within a region outside of Cell#1 and inside of a fringe area F2 of Cell#2. One reason cell dragging occurs is that the UE receives a relatively strong signal from a base station B1 of Cell#1, and provided the signal strength is adequate, the UE does not seek another cellular connection, such as a connection to base station B2 of Cell#2. In some circumstances, the quality of UE's connection is compromised during cell dragging. For example, even though the signal strength of Cell#1 may be sufficient to maintain the connection, it may be desirable for UE to reselect Cell#2 because the quality of the connection between the UE and Cell#2 will be better.

SUMMARY

According to an embodiment of the invention, there is provided a method of cell reselection using vehicle telematics unit coupled to a vehicle antenna. The method includes: performing a measurement of a reference signal from a serving cell that is connected to the telematics unit; determining whether to perform a measurement of a target cell based on both a serving cell signal strength value (Srxlev) and a measured serving cell signal quality value (Qqualmeas); and when the measurement of the target cell is performed, then determining whether to reselect to the target cell based on cell selection values of the serving and target cells.

According to another embodiment of the invention, there is provided a method of cell reselection using vehicle telematics unit coupled to a vehicle antenna. The method includes: determining an antenna offset ($O_{ANT}$) associated with the vehicle antenna and associated with a reference signal of a serving cell upon which the telematics unit is camped on; and using the offset ($O_{ANT}$) during a cell reselection process that includes evaluating the serving cell and a target cell.

According to another embodiment of the invention, there is provided a method of cell reselection using vehicle telematics unit coupled to a vehicle antenna. The method includes: calculating at the telematics unit a cell selection signal strength value (Srxlev) of a serving cell; determining an antenna offset ($O_{ANT}$) associated with both the signal strength value (Srxlev) of the serving cell and the vehicle antenna; determining a measured cell signal quality value (Qqualmeas) associated with the serving cell; comparing the signal quality value (Qqualmeas) of the serving cell to a predetermined threshold (TH1) stored in memory of the telematics unit; when the measured cell signal quality value (Qqualmeas) is less than the threshold (TH1), then applying the offset ($O_{ANT}$) to the measurement of the cell selection signal strength value (Srxlev) of the serving cell; and determining whether to reselect to a target cell at least partially based on the applied offset ($O_{ANT}$).

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to cellular or cell selection and/or reselection of a vehicle telematics unit that is coupled to a vehicle antenna. Cell selection occurs when the telematics unit is not connected to a wireless network. And cell reselection occurs when the vehicle is camped on a first cell and reselects or switches to a neighboring cell (camping thereon)—e.g., as opposed to handing-off (which occurs when the telematics unit is engaged in an active voice or data call and hands-off or switches between neighboring cells). Cellular chipset manufacturers provide chipsets adapted for integration into handheld mobile devices, laptop devices, and the like. The antennas used by these types of devices provide the chipset with a nominal signal gain; i.e., an expected gain (e.g., within a predetermined or expected range). However, vehicle antennas differ from mobile or laptop devices, or the like—e.g., vehicle antennas may provide a corresponding vehicle cellular chipset a significantly higher signal gain. This occurs in some instances because the antenna sometimes is mounted to the vehicle roof which effectively enlarges the size of the antenna—e.g., when electrically coupled, the rooftop acts as an antenna too thereby amplifying the overall signal gain. As a result, the vehicle cellular chipset can receive a gain abnormally higher than expected. One such commercial example is a so-called shark fin antenna mounted atop a rooftop of a passenger vehicle or SUV. In some circumstances, this abnormally high antenna gain can cause cell dragging (FIG. 1); and, as discussed above, this may result in a cellular connection which has poorer quality than if the telematics unit simply reselected the neighboring cell. Described below is a method for appropriately triggering the telematics unit to reselect a target or neighboring cell in view of a high gain antenna.

Communications System—

Figure 2:
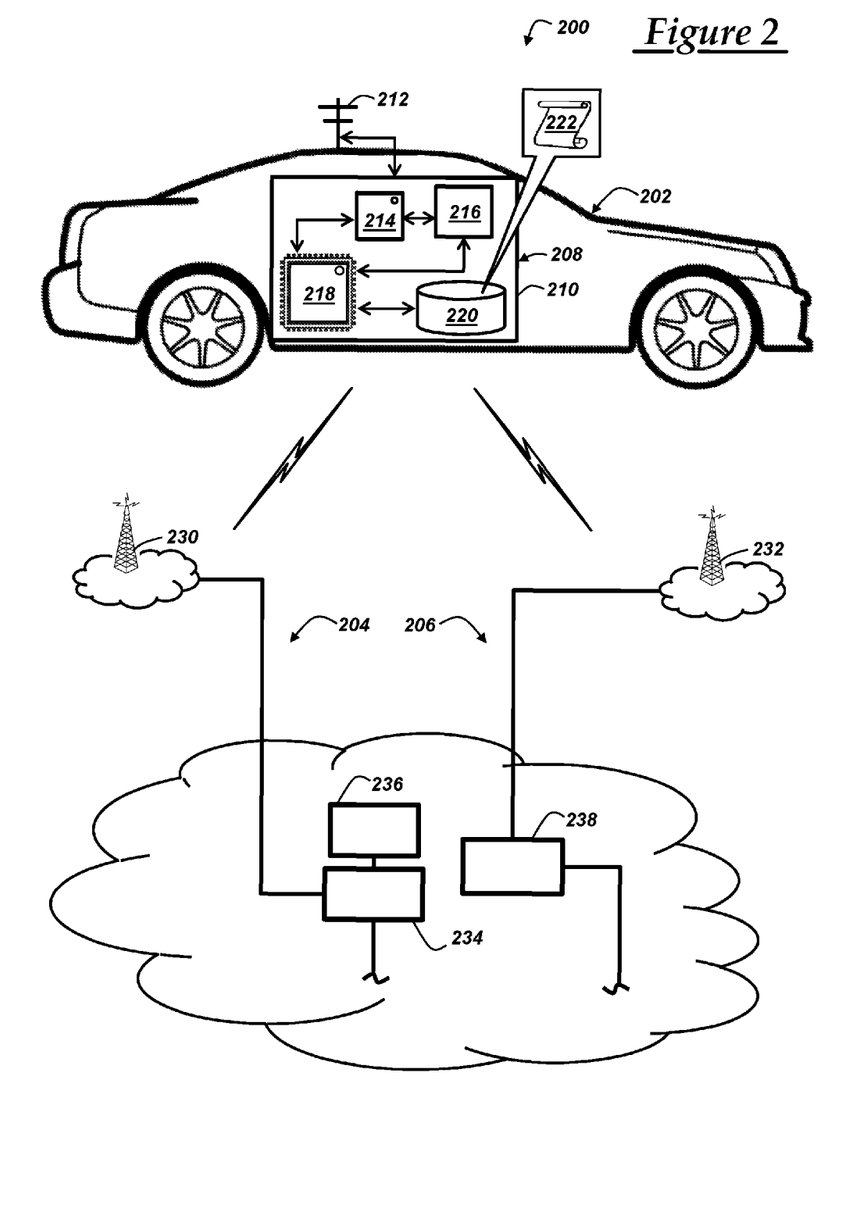
FIG. 2 is a block diagram depicting an embodiment of a communications system that is capable of utilizing the method disclosed herein.

With reference to FIG. 2, there is shown an operating environment that comprises a mobile vehicle communications system 200 and that can be used to implement the method disclosed herein. Communications system 200 generally includes a vehicle 202, and one or more wireless carrier systems 204, 206. It should be understood that the disclosed method can be used with any number of different systems and is not specifically limited to the operating environment shown here. Also, the architecture, construction, setup, and operation of the wireless carrier systems 204, 206 and its individual components are generally known in the art. The following paragraphs simply provide a brief overview of one illustrative communications system 200; however, other systems not shown here could be used to carry out the disclosed method as well.

Vehicle 202 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 202 may include numerous vehicle system modules 208 (although only one is shown), and these module 208 may be interconnected by network connections such as a communication bus (not shown) or the like. For illustration purposes only, one system module is shown—a vehicle telematics unit 210 coupled to a vehicle antenna 212.

Telematics unit 210 can be an OEM-installed (embedded) or aftermarket device that is installed in the vehicle and that enables wireless voice and/or data communication over wireless carrier system(s) 204, 206 and via other wireless networking systems. This enables the vehicle to communicate with a telematics backend system, other telematics-enabled vehicles, or some other wireless entity or device. The telematics unit preferably uses radio transmissions to establish a communications channel (a voice channel and/or a data channel) with wireless carrier system(s) 204, 206 so that voice and/or data transmissions can be sent and received over the channel. By providing both voice and data communication, telematics unit 210 enables the vehicle 202 to offer a number of different services including those related to navigation, telephony, emergency assistance, diagnostics, infotainment, etc. Data can be sent either via a data connection, such as via packet data transmission over a data channel, or via a voice channel using techniques known in the art.

According to one embodiment, telematics unit 210 utilizes cellular communication according to either GSM, CDMA, or LTE standards and thus includes a cellular chipset 214 for data and voice communications like hands-free calling, a wireless modem 216 for data transmission, an electronic processing device or processor 218, one or more digital memory devices 220, and the antenna 212. Chipset 214 may be a semiconductor device embedded within the telematics unit 210 that is adapted to facilitate cellular communication. It may be adapted to communicate via one or more cellular protocols (e.g., a dual chipset capable of LTE and CDMA communications or the like). A non-limiting commercial example is the Qualcomm LTE-Advanced chipset which supports LTE FDD/TDD Advanced Category 6. In at least one embodiment, some parameters of the chipset 214 may not configurable by the telematics unit or vehicle manufacturer, but only configurable, if at all, by the chipset manufacturer. For example, parameters associated with cell selection and/or reselection may not be configurable (e.g., signal strength and/or quality parameters, as discussed more below). However, telematics unit software 222 (e.g., stored in and executable from memory 220 or within processor(s) 218) may be configurable by the vehicle manufacturer or authorized service personnel to operate with the chipset 214 in any suitable manner, such as those methods discussed below.

It should be appreciated that the modem 216 can either be implemented through software 222 that is stored in the telematics unit 210 and executed by processor 218, or it can be a separate hardware component located internal or external to telematics unit 210. The modem 216 can operate using any number of different standards or protocols such as LTE, EVDO, CDMA, GPRS, and EDGE. Wireless networking between the vehicle 202 and other networked devices can also be carried out using telematics unit 210. For this purpose, telematics unit 210 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 210 can be configured with a static or dynamic IP address or can set up to automatically receive an assigned IP address from another device on the network such as a router or from a network address server.

Processor 218 can be any type of device capable of processing electronic instructions including microprocessors, microcontrollers, host processors, controllers, vehicle communication processors, and application specific integrated circuits (ASICs). It can be a dedicated processor used only for telematics unit 210 or can be shared with other vehicle systems. Processor 218 executes various types of digitally-stored instructions, such as software or firmware programs stored in memory 220, which enable the telematics unit to provide a wide variety of services. For instance, processor 218 can execute programs or process data to carry out at least a part of the method discussed herein. For example, according to at least one embodiment, processor 218 may execute software application instructions 222 to receive or determine values associated with a serving cell signal strength or quality, determine whether to measure a target cell signal strength, and determine whether to apply an antenna gain offset value ($O_{ANT}$) associated with the vehicle antenna 212 in a cell reselection process, as will be explained in greater detail below.

Thus, the method(s) described herein may be performed as one or more computer programs executable by the vehicle telematics unit 210 to cause the unit 210 to perform the method, and the various method related data may be stored in any suitable memory (e.g., such as memory 220). The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices 220 include conventional computer system RAM (random access memory), ROM (read only memory), EPROM (erasable, programmable ROM), EEPROM (electrically erasable, programmable ROM), and magnetic or optical disks or tapes. The memory 220 may be at least partially integral to processor 218, modem 216, or the like. It is therefore to be understood that the methods may be at least partially performed by any electronic device(s) capable of executing the above-described functions Wireless carrier systems 204, 206 are preferably cellular telephone systems that each include a plurality of cell towers (e.g., such as 230 or 232, respectively) connected to a number of other cellular components known in the art. For example, in LTE systems, tower 230 may be associated with an eNodeB which is coupled to a serving gateway (S-GW) 234—which may further be coupled to other components (e.g., a mobility management entity or MME 236, a home subscriber server or HSS (not shown), and the like). Or for example, in GSM systems, tower 232 may be associated with a base station transceiver (BTS) coupled to a serving GPRS support node (SGSN) 238—which may be further coupled to other components not shown (e.g., a gateway GPRS support node (GGSN) and the like). All such components and their implementation and use are known and will not be described in greater detail here. Of course, wireless carrier systems 204, 206 are not limited to LTE and GSM systems or the illustrated implementations; e.g., the phrase wireless carrier systems should be construed broadly to include other carrier systems as well (e.g., including but not limited to WCDMA, CDMA, CDMA2000, AMPS, etc.). Further, it should be appreciated that carrier systems 204, 206 also may be coupled to a land network (not shown)—e.g., enabling interconnectivity to public switched telephone network (PSTN) such as that used to provide hardwired telephony, packet-switched data communications, internet infrastructure, and the like.

Method—

Figure 3A:
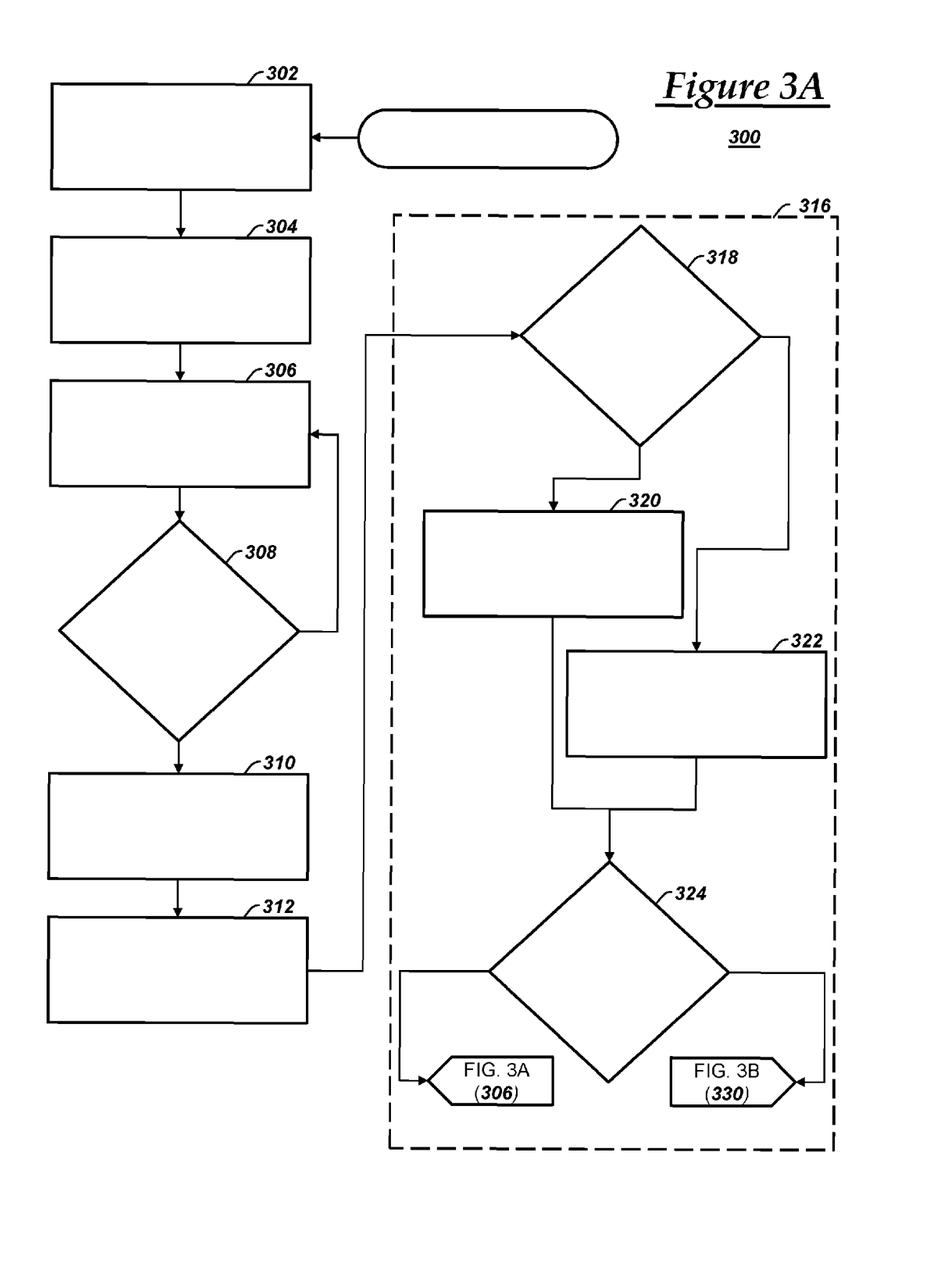
FIGS. 3A-3C illustrate a flow diagram depicting a method of cellular reselection using a vehicle antenna.
Figure 3B:
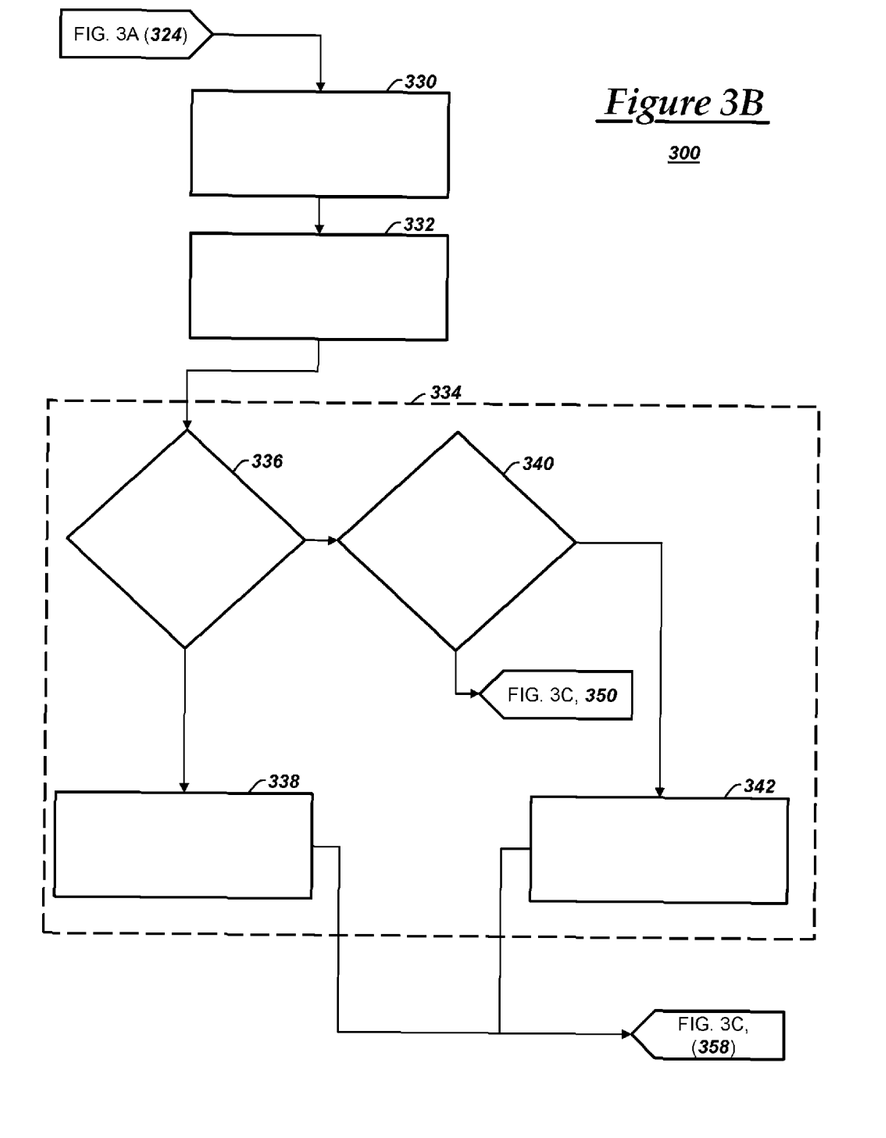
Figure 3C:
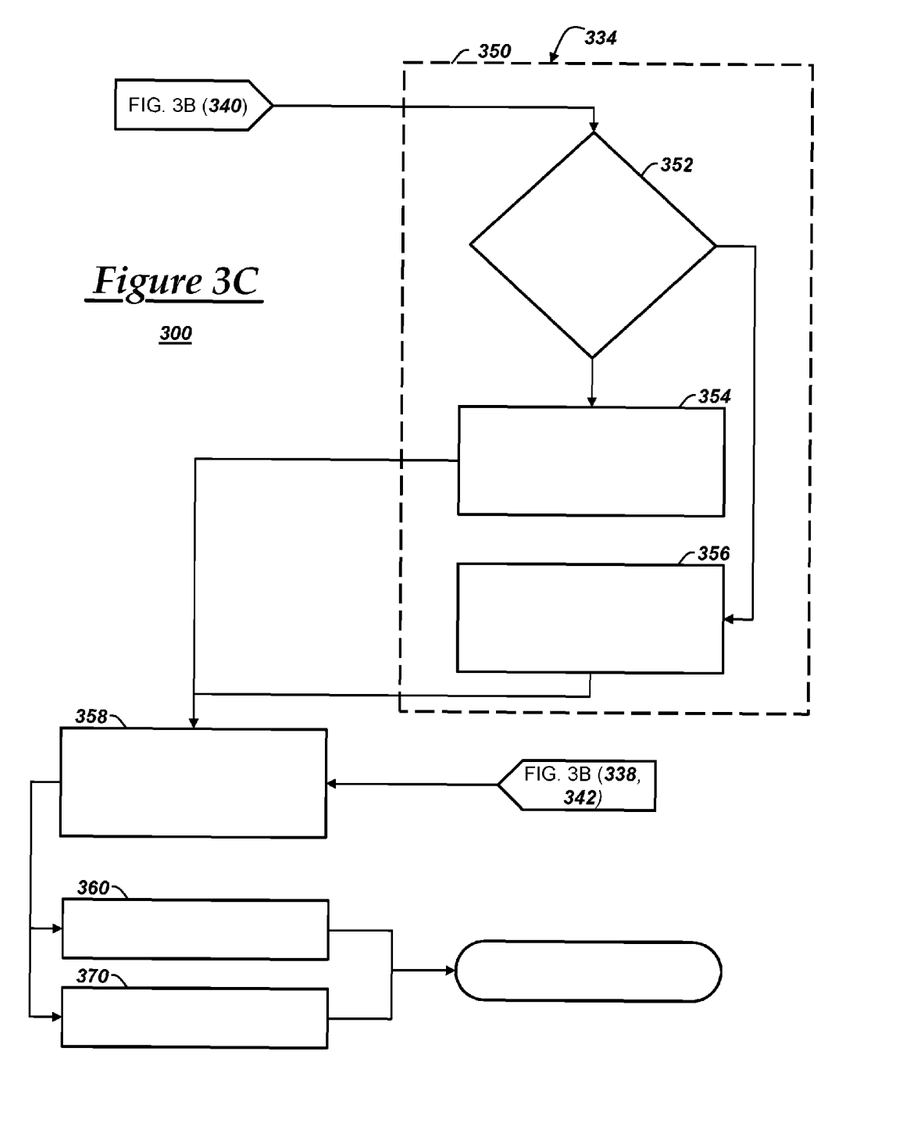

Turning now to FIGS. 3A-3C, there is shown a method 300 of cell reselection using vehicle telematics unit 210 and vehicle antenna 212. In at least one embodiment of cell reselection, the telematics unit 210 and chipset 214 may be adapted to operate according to LTE Releases 8 and 9, which implementation is discussed below; however, while the method 300 is illustrated using LTE Rel. 8 and 9, it should be appreciated that this is merely an example and other implementations are also possible (for example, the method 300 may be used in later LTE releases as well). In method 300, when the telematics unit 210 is in an idle mode, it is camped on a cell and may determine cell reselection. Skilled artisans will appreciate that idle mode enables the telematics unit 210 (when registered) to establish a radio resource control (RRC) connection, receive paging messages from the wireless carrier system 230, etc. As used herein, when the telematics unit 210 is in idle mode, it is not in an active mode (e.g., it is not engaged in a voice or data call).

Further, it should be appreciated that when the telematics unit 210 is camped on a serving cell (such as Cell#1 in FIG. 1 which is currently 'serving' it) (e.g., camped on LTE or camped on LTE DRx), cell reselection evaluation may include determining whether to camp on a target cell (e.g., one of the neighboring cells which is not 'serving' it, such as Cell #2 in FIG. 1). Cell #2 could be another LTE cell, a GSM cell, a CDMA2000 cell, or the like. Further, it should be appreciated that cell reselection evaluation may occur when the target cell broadcasts over the same cellular protocol and same frequency (e.g., LTE frequency1 to LTE frequency1)—i.e., an intra-frequency reselection. Or cell reselection evaluation may occur when the target cell broadcasts over a different frequency but e.g., the same cellular protocol (e.g., LTE frequency1 to LTE frequency2)—i.e., an inter-frequency reselection. Further, cell reselection evaluation may occur when the target cell broadcasts over a different cellular protocol (e.g., LTE (serving cell) to CDMA2000 (target cell))—i.e., an inter-RAT (radio access technology) reselection.

Method 300 begins with step 302; in step 302, the telematics unit 210 receives system information block (SIB) data via a wireless broadcast by a serving cell evolved node B 230 (or simply: serving eNB 230) (see also FIG. 2). In at least one embodiment, this includes SIBs 3-8 data. Skilled artisans will appreciate that SIB data includes cell access and other related parameters, and that SIBs 3-8 data pertains to cell reselection parameters.

In step 304 which follows, the telematics unit 210 may extract, decode, and/or otherwise determine the reselection parameters based on the SIB data received in step 302. The reselection parameters may include threshold parameters—e.g., signal power and quality parameters such as Thresh-Serving,LowQ, ThreshX,HighQ, ThreshX,LowQ, Thresh-Serving,LowP, ThreshX,HighP, and ThreshX,LowP (e.g., in LTE Release 9), or only power parameters such as Thresh-Serving,Low, ThreshX,High, and ThreshX,Low (e.g., in LTE Release 8). Reselection parameters also may include other parameters such as priority parameters, SIntraSearchP, SIntraSearchQ, SnonIntraSearchP, SnonIntraSearchQ, and the like. These and other parameters will be appreciated by those skilled in the art. For example, priority parameters may indicate whether a neighboring cell is of higher priority, lower priority, or equal priority. Of course, these are merely examples of parameters which will be described in greater detail below; other parameters are possible. Extracted or otherwise determined reselection parameters may be stored, at least temporarily, in memory 220.

In step 306 which follows, serving eNB 230 transmits a wireless reference signal that is received by the telematics unit 210. Using the reference signal, the telematics unit 210 in the steps below may determine and/or calculate a serving cell value—e.g., a cell selection quality value (Squal) or a cell selection signal strength value (Srxlev). For example, if telematics unit 210 is adapted for use with LTE Release 8, it may determine and/or calculate a cell selection signal strength value (Srxlev) in response to receiving the reference signal; however based on Release 8 rules, it may not determine and/or calculate a cell selection quality value (Squal). Or for example, a telematics unit 210 configured to use LTE Release 9 may determine and/or calculate a cell selection signal strength value (Srxlev) and a cell selection quality value (Squal). In another example, if the telematics unit (Release 9) does not receive the appropriate quality parameters in the received SIB(s), the telematics unit alternatively may determine and/or calculate a cell selection signal strength value (Srxlev) (e.g., instead of the cell selection quality value (Squal)).

In step 308 which follows, the telematics unit 210 may determine whether a measurement was scheduled during a particular period. For example, mobile chipset devices such as chipset 214 may be programmed to periodically measure signal strength or quality. If a measurement is scheduled, the method 300 proceeds to step 310; if it is not, method 300 loops back to step 306 and repeats steps 306 and 308 until a measurement is scheduled.

Following step 308 (in step 310), the telematics unit determines a measurement of a reference signal from the serving cell eNB 230. This may include determining the cell selection signal strength value (Srxlev) or the cell selection quality value (Squal) using the Equations (1) or (2) shown below.

$$\text{Srxlev} = \text{Qrxlevmeas} - (\text{Qrxlevmin} + \text{Qrxlevminoffset}) - \text{Pcomp} - \text{Qoffsettemp}, \quad \text{Equation (1)}$$

Where Pcomp=max(PEMAX−PUMAX, 0), where PEMAX=a maximum allowed uplink transmit power, and PUMAX=a maximum telematics unit transmit output power (e.g., stored in telematics unit memory or determinable by the telematics unit). Qrxlevmeas is a measured received (RX) signal value, and Qrxlevmin and Qrxlevminoffset and PEMAX are parameters defined by the wireless carrier system and which may be broadcast via system information blocks (SIBs). And Qoffsettemp is an offset temporarily applied to the cell as specified in 3GPP TS 36.331 (Rel. 12), E-UTRA; Radio Resource Control (RRC)—Protocol Specification, the entirety of which is incorporated by reference herein.

$$\text{Squat} = \text{Qqualmeas} - (\text{Qqualmin} + \text{Qqualminoffset}) - \text{Qoffsettemp}, \quad \text{Equation (2)}$$

Where Qqualmeas is a measured cell quality value, and Qqualmin and Qqualminoffset are parameters defined by the wireless carrier system 204 and which may be broadcast via system information blocks (SIBs). It should be appreciated that Qrxlevminoffset may be used to optimize the cell coverage and that Qoffsettemp may be used to redirect the device in case of RRC connection timeout.

In step 312, the telematics unit 210 may next calculate or otherwise determine a vehicle antenna gain offset ($O_{ANT}$)—which may be designed to avoid undesirable cell selection (or reselection) causing excessive interference due to high antenna gain. In one embodiment, the offset $O_{ANT}$ is determined using a predetermined gain constant stored in memory 220 and a linear formula (e.g., current signal strength*gain constant). The gain constant may be determined based on the particular antenna and the particular vehicle implementation. For example, different antennas may have different gain characteristics. Further, excessive antenna gain may vary based upon the vehicle characteristics—e.g., a vehicle having a larger rooftop (with antenna 212 mounted thereon) may amplify the reference signal more than a vehicle having a smaller rooftop. Thus, the value of the gain constant may vary depending upon the implementation. In another embodiment, the offset $O_{ANT}$ may not be calculated during each execution of the method 300, but instead may be retrieved from memory 220 (e.g., being a value stored therein). In other embodiments, the offset $O_{ANT}$ may be calculated using a non-linear formula or the like. Other determinations will be appreciated by skilled artisans.

Following step 312, the serving eNB 230 may be evaluated in step 316 to determine whether the telematics unit 210 should consider measuring a neighboring or target cell. Step 316 may include several sub-steps (e.g., steps 318, 320, 322, and 324). Using the vehicle antenna gain offset $O_{ANT}$, the telematics unit 210 may avoid an unnecessary or undesirable determination of a target cell. For example, it may not be desirable to utilize chipset computing resources to measure (and/or evaluate) available target cell(s) when the serving eNB signal has sufficient power or quality.

Step 318 determines whether to apply the gain offset $O_{ANT}$. The gain offset is applied when the measured cell signal quality value (Qqualmeas) of the serving cell signal is less than a predetermined threshold (TH1) stored in telematics unit memory 220. Threshold (TH1) may be a vehicle-specific value determined by the vehicle manufacturer—e.g., based on one or more of the following factors: the selected cellular chipset 214, the selected vehicle antenna 212, or the like. In this manner, telematics units configured to Release 8 (which typically only evaluate reselection based on signal strength criteria, may use both signal quality and signal strength criteria in the reselection process. Similarly, in telematics unit configured to Release 9 (which typically use signal strength criteria when signal quality criteria is not available), also may use both signal quality and signal strength criteria in the reselection process. When serving cell's measured cell signal quality value (Qqualmeas) is less than threshold TH1, then method 300 applies the gain offset in step 320; and when the serving cell's measured cell signal quality value (Qqualmeas) is greater than or equal to threshold TH1, then the method proceeds to step 322 (e.g., not applying the gain offset).

In step 320, the gain offset is applied. In at least one embodiment, the gain offset is applied according to the signal strength value Equation (1') below.

Equation (1') Srxlev=[Qrxlevmeas−$O_{ANT}$]−(Qrxlevmin+Qrxlevminoffset)−Pcomp−Qoffsettemp, where $O_{ANT}$ is subtracted from the serving cell's measured cell RX level value (Qrxlevmeas) and the other remaining parameters are the same as those discussed above. Of course, it is contemplated that the serving cell's measured cell RX level value (Qrxlevmeas) may be relatively higher in vehicle implementations—e.g., due to use of high gain vehicle antenna 212 with chipset 214—thus, the value of $O_{ANT}$ offsets or compensates for this atypically higher gain in some vehicles. Following step 320, the method proceeds to step 324.

In step 322, no gain offset is applied. Thus, the serving cell's cell selection signal strength value (Srxlev) is the same as shown and discussed in Equation (1) above. The method 300 proceeds to step 324.

In step 324, the processor 218 determines whether to trigger a target cell measurement based on the cell selection signal strength value (Srxlev) of the serving eNB 230. If the cell selection signal strength value (Srxlev) is greater than or equal to a predetermined value (e.g., provided in the SIB data), then no measurement of the target cell will be triggered, and chipset 214 will continue to be camped on the serving eNB 230. Conversely, if the cell selection signal strength value (Srxlev) is less than the predetermined value, then a target cell measurement will be triggered. In the latter instance, the telematics unit will determine whether it is preferable to camp on the target cell instead of the remaining camped on the serving cell. In method 300, the gain offset $O_{ANT}$ may or may not be applied; therefore, there are four possible scenarios: a) serving cell's cell selection signal strength value (Srxlev) sufficiently high enough to not trigger target cell measurement and signal quality relatively low (measured cell signal quality value (Qqualmeas)<TH1); b) serving cell's cell selection signal strength value (Srxlev) sufficiently high enough to not trigger target cell measurement and signal quality relatively high (Qqualmeas≥TH1); c) serving cell's cell selection signal strength value (Srxlev) low enough to trigger target cell measurement and signal quality relatively low (Qqualmeas<TH1); and d) serving cell's cell selection signal strength value (Srxlev) low enough to trigger target cell measurement and signal quality relatively high (Qqualmeas≥TH1).

In scenarios (a) and (b), no measurement of a target cell is triggered, and the method 300 proceeds to step 306. And in step 306, when a reference signal is again received, the method will continue to step 308—as previously described. It should be appreciated that in scenario (a), the gain offset $O_{ANT}$ was applied; however, even when the cell selection signal strength value (Srxlev) was decreased by the gain offset $O_{ANT}$ as in Equation (1'), the signal strength value (Srxlev) was still sufficiently large enough to not trigger the target cell measurement, e.g., in accordance with 3GPP rules. Further, it should be appreciated that in scenario (b), the gain offset $O_{ANT}$ was not applied; therefore, the measured cell signal quality value (Qqualmeas) was greater than or equal to the stored threshold TH1. In this latter example, the target cell measurement was not triggered in part because the signal quality of serving cell eNB 230 was determined to be sufficient. Scenarios (a) and (b) illustrate a determination to not trigger a target cell measurement that is associated with both a serving cell signal strength value (Srxlev) and a serving cell measured quality value (Qqualmeas).

In scenarios (c) and (d), a measurement of a target cell is triggered, and the method 300 proceeds to step 330. It should be appreciated that in scenario (c), the gain offset $O_{ANT}$ was applied. In this instance, subtracting the gain offset $O_{ANT}$ in Equation (1) may reduce the cell selection signal strength value (Srxlev) to a value small enough to trigger the target cell measurement—e.g., balancing the equation due to the excessive contribution of the high gain antenna 214. Further, it should be appreciated that in scenario (d), the gain offset $O_{ANT}$ was not applied; therefore, both the signal strength value (Srxlev) and measured cell signal quality value (Qqualmeas) were sufficiently low. For example, even without further reducing the cell selection signal strength value (Srxlev) by the gain offset $O_{ANT}$, the signal strength value (Srxlev) was sufficient to trigger the target cell measurement in accordance with 3GPP rules. And the measured cell signal quality value (Qqualmeas) was determined to be relatively low because it was less than the stored threshold TH1. Scenarios (c) and (d) illustrate a determination to trigger a target cell measurement that is associated with both a serving cell signal strength value (Srxlev) and a serving cell measured quality value (Qqualmeas).

Turning now to FIG. 3B, in step 330—having determined to measure the target cell—the telematics unit 210 may receive a wireless reference signal from the target cell. This reference signal may be similar to the reference signal discussed in step 306, except that it be received from the target cell instead of the serving cell.

In step 332 which follows, the telematics unit 210 may measure a cell RX level value (Qrxlevmeas) of the target signal, a cell signal quality value (Qqualmeas) of the target cell, or both. Step 334 which follows may be used to determine whether to apply the gain offset $O_{ANT}$ to the target cell measurements. As will be discussed below, once the appropriate values are determined in step 334—e.g., applying or not applying the gain offset $O_{ANT}$—then the serving cell values and the target cells values may be compared in order to determine whether to reselect and camp on the target cell or to not reselect and remain camped on the serving cell. Step 334 includes a number of sub-steps: steps 336, 338, 340, 342, 352, 354, and 356.

In step 336, the processor 218 may determine whether the gain offset $O_{ANT}$ was applied in step 318. If the gain offset was applied, method 300 may proceed to step 338. If the gain offset was not applied in step 318, then the method 300 may proceed to step 340.

In step 338, the gain offset $O_{ANT}$ is applied to the target cell measurement—e.g., subtracting the high gain antenna offset $O_{ANT}$ from the measured cell RX level value (Qrxlevmeas) of the target cell. Essentially, step 338 applies Equation (1') but uses target cell values received in step 332. Thereafter, the method proceeds to step 358.

In step 340, the priority of the target cell is evaluated. If the target cell is of higher priority than the serving cell, then method 300 proceeds to step 350—which is discussed below. However, if the target cell is equal or lower priority with respect to the serving cell, then the method proceeds to step 342.

In step 342, the gain offset $O_{ANT}$ is not applied to the target cell measurement. Essentially, step 342 applies Equation (1) but uses target cell values received in step 332. Thereafter, the method proceeds to step 358.

Turning now to FIG. 3C, in step 350, a process is discussed for target cells having higher priority than the serving cell wherein no high gain antenna offset $O_{ANT}$ was applied to the serving cell's cell selection signal strength value (Srxlev) (in step 318). It should be appreciated that no gain offset was applied because the serving cell's measured cell signal quality value (Qqualmeas) was greater than or equal to the predetermined threshold TH1—i.e., the serving cell signal quality was deemed sufficient. Step 350 includes a number of sub-steps: 352, 354, and 356.

In step 352, a measured cell signal quality value (Qqualmeas) of the target cell is compared with the predetermined threshold TH1 and a delta ($\Delta$) value. If the target cell's signal quality value (Qqualmeas) is less than the sum of TH1 and the delta ($\Delta$) value, then the method 300 proceeds to step 356—applying the gain offset $O_{ANT}$ to the target cell's cell selection signal strength value (Srxlev). And if the target cell's signal quality value (Qqualmeas) is greater than or equal to the sum of TH1 and the delta ($\Delta$) value, then the method proceeds to step 354—not applying the gain offset $O_{ANT}$ to the target cell's cell selection signal strength value (Srxlev). The delta ($\Delta$) value can be considered a margin of error or tolerance value associated with signal quality that is stored in memory 220—and used to inhibit the telematics unit 210 (or more specifically the chipset 214) from ping-ponging back and forth between the serving cell and target cell. So-called ping-ponging refers to repetitively reselecting back and forth between the same two adjacent cells—e.g., a predetermined quantity of times within a predetermined period of time. For example, in the absence of the delta ($\Delta$) value in step 352, the telematics unit 210 may reselect the target cell (in part because the Qqualmeas was marginally greater than or equal to TH1) only then to reselect the previous serving cell (again, in part because the Qqualmeas of the serving cell is at least slightly less than TH1; i.e., slightly degraded). Thus, this delta ($\Delta$) value inhibits ping-ponging—urging the telematics unit 210 to reselect the cell with the better signal quality.

In step 354, the gain offset $O_{ANT}$ is not applied to the target cell's cell selection signal strength value (Srxlev). Essentially, step 354 applies Equation (1) using target cell signal strength criteria (instead of serving cell criteria), including parameters received in step 332. It should be appreciated that cell reselection (which follows in step 358) will utilize both serving and target cell's cell selection signal strength values without gain offset—e.g., since the target cell signal quality value (Qqualmeas) is greater than or equal to TH1+$\Delta$, whereas the serving cell signal quality (Qqualmeas) is only greater than or equal to TH1.

In step 356, the gain offset $O_{ANT}$ is applied to the target cell's cell selection signal strength value (Srxlev). Essentially, step 356 applies Equation (1') using the target cell's cell selection signal strength criteria (instead of serving cell signal strength criteria), including parameters received in step 332. Here, the signal quality of the target cell is less than TH1+$\Delta$. Applying the gain offset using Equation (1') reduces the cell selection signal strength value (Srxlev) of the target cell relative to that of the serving cell (Srxlev of serving cell)—e.g., the gain offset is subtracted with respect to the target cell signal strength, but not subtracted with respect to the serving cell. The method determines cell reselection in step 358 which follows.

In step 358, cell reselection occurs according to 3GPP rules—e.g., using the power values associated with the serving cell (serving cell Srxlev) and target cell (target cell Srxlev). As discussed above—e.g., in steps 318, 320, 322, 334, 336, 338, 340, 342, 350, 352, 354, and 356—the value of Srxlev for the serving cell, the value of Srxlev for the target cell, or both may be altered using a high antenna gain offset $O_{ANT}$. As will be appreciated by skilled artisans, a summary of 3GPP cell reselection rules is provided in Table I. Other rules and implementations thereof will be appreciated by skilled artisans.

TABLE I

| | LTE Release 8 (e.g., UTRAN TDD, GERAN, CDMA2000) | LTE Release 9 (e.g., E-UTRAN, UTRAN FDD) |
|---|---|---|
| Intra-frequency reselection | | |
| Equal priority | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters |
| Higher priority | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters |
| Lower priority | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters |
| Inter-frequency reselection | | |
| Equal priority | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters |
| Higher priority | Cell reselection if Srxlev (target cell) > ThreshX, HighP for a predetermined time interval and the telematics unit has been camped on the serving cell for at least a predetermined amount of time | If ThreshServing, LowQ is provided in SIB, cell reselection if Squal (target cell) > ThreshX, HighQ for a predetermined time interval and the telematics unit has been camped on the serving cell for at least a predetermined amount of time |
| Higher priority | | If ThreshServing, LowQ is not provided in SIB, cell reselection if Srxlev (target cell) > ThreshX, HighP for a predetermined time interval and the telematics unit has been camped on the serving cell for at least a predetermined amount of time |
| Lower priority | Cell reselection if Srxlev (serving cell) < ThreshServing, LowP for a predetermined time interval, if Srxlev (target cell) > ThreshX, LowP for the predetermined time interval, and if the telematics unit has been camped on the serving cell for at least a predetermined amount of time | If ThreshServing, LowQ is provided in SIB, cell reselection if Squal (serving cell) < ThreshServing, LowQ for a predetermined time interval, if Squal (target cell) > ThreshX, LowQ for the predetermined time interval, and if the telematics unit has been camped on the serving cell for at least a predetermined amount of time |
| Lower priority | | If ThreshServing, LowQ is not provided in SIB, cell reselection if Srxlev (serving cell) < ThreshServing, LowP for a predetermined time interval, if Srxlev (target cell) > ThreshX, LowP for the predetermined time interval, and if the telematics unit has been camped on the serving cell for at least a predetermined amount of time |
| Inter-RAT frequency reselection | | |
| Equal priority | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters | Cell reselection if Rtarget > Rserving for predetermined interval of time, where Rserving = RSRP(serving) + Qhyst and Rtarget = RSRP(target) + Qoffset, where Qhyst and Qhyst are broadcasted parameters |
| Higher priority | Cell reselection if Srxlev (target cell) > ThreshX, HighP for a predetermined time interval and the telematics unit has been camped on the serving cell for at least a predetermined amount of time | If ThreshServing, LowQ is provided in SIB, cell reselection if Squal (target cell) > ThreshX, HighQ for a predetermined time interval and the telematics unit has been camped on the serving cell for at least a predetermined amount of time |

TABLE I-continued

| | LTE Release 8 (e.g., UTRAN TDD, GERAN, CDMA2000) | LTE Release 9 (e.g., E-UTRAN, UTRAN FDD) |
|---|---|---|
| Higher priority | | If ThreshServing, LowQ is not provided in SIB, cell reselection if Srxlev (target cell) > ThreshX, HighP for a predetermined time interval and the telematics unit has been camped on the serving cell for at least a predetermined amount of time |
| Lower priority | Cell reselection if Srxlev (serving cell) < ThreshServing, LowP for a predetermined time interval, if Srxlev (target cell) > ThreshX, LowP for the predetermined time interval, and if the telematics unit has been camped on the serving cell for at least a predetermined amount of time | If ThreshServing, LowQ is provided in SIB, cell reselection if Squal (serving cell) < ThreshServing, LowQ for a predetermined time interval, if Squal (target cell) > ThreshX, LowQ for the predetermined time interval, and if the telematics unit has been camped on the serving cell for at least a predetermined amount of time |
| Lower priority | | If ThreshServing, LowQ is not provided in SIB, cell reselection if Srxlev (serving cell) < ThreshServing, LowP for a predetermined time interval, if Srxlev (target cell) > ThreshX, LowP for the predetermined time interval, and if the telematics unit has been camped on the serving cell for at least a predetermined amount of time |

Based on the rules of Table I and based on steps such as steps 318, 320, 322, 334, 336, 338, 340, 342, 350, 352, 354, and/or 356, the telematics unit 210 will remain camped on the serving cell [step 360] or will reselect and camp on the target cell [step 370]. Thus, it should be appreciated that telematics units configured to operate in accordance with LTE Release 8—which otherwise would only consider signal power values when determining whether to reselect—also may consider relative signal quality of the serving and/or target cells. Similarly, it should be appreciated that telematics units configured to operate in accordance with LTE Release 9—which under certain circumstances would only consider signal power values when determining whether to reselect (e.g., insufficiently available signal quality data)—also may consider relative signal quality of the serving and/or target cells. Thus, FIGS. 3A-3C illustrate a method wherein a vehicle telematics unit (e.g., 210) with a high gain antenna 212 may use both signal power and quality information in determining whether to reselect to a neighboring or target cell.

Other implementations are also contemplated. In one embodiment, the gain offset applied in step 320 for example may have a variable value depending on whether the cell selection signal strength value (Srxlev) of the serving cell is greater than zero. For example, when Srxlev is greater than zero, the offset ($O_{ANT}$) may be calculated to be the lesser of the offset ($O_{ANT}$) or a secondary value—where the secondary value may be the Srxlev−M (M being a predetermined value or margin stored in the telematics unit memory 220). Conversely, when Srxlev is less than or equal to zero, the offset ($O_{ANT}$) may be set to zero (0). This embodiment may avoid instances where the telematics unit 210 would otherwise go out-of-service (e.g., because determining the power of the serving cell (by subtracting the offset ($O_{ANT}$) from the Srxlev) would indicate to the telematics unit that it was out-of-service).

In at least one other embodiment, when the telematics unit 210 determines an absence of wireless service (e.g., insufficient or no signal)—the method 300 described above may be temporarily disabled. For example, the telematics unit 210 (and chipset 214) may not calculate and/or use the gain offset $O_{ANT}$ and may operate according to conventional 3GPP reselection steps. In at least one embodiment, the gain offset $O_{ANT}$ may not be used if a cell signal is not found within a predetermined period of time; e.g., the telematics unit 210 may disable method 300 if a timer set to a predetermine period of time expires.

In at least one other embodiment, the method 300 is used in initial cell selection—e.g. as opposed to idle mode reselection. Skilled artisans will appreciate that initial cell selection pertains to selecting a cell when the telematics unit is powered up (or is not currently connected to a cell—i.e., not connected to any serving cell).

According to another embodiment, either different gain offset $O_{ANT}$ values are stored in memory 220 or a different gain constant (e.g., used to calculate or determine the gain offset) is stored in memory 220. In at least one embodiment, different gain offset $O_{ANT}$ values are used during initial cell selection and idle mode cell reselection. For example, in one embodiment, during initial cell selection, the gain offset $O_{ANT}$ value may be set to zero (0), and during idle mode cell reselection, the gain offset $O_{ANT}$ value may be determined as described above in method 300. In this manner, the high gain antenna 212 could be used to improve the opportunity to initially connect to the wireless carrier system 204, 206 (i.e., by not subtracting the offset).

According to another embodiment, the gain offset $O_{ANT}$ value may be set to zero (0) upon receiving an indication at the telematics unit 210 of one or more vehicle conditions. For example, if the telematics unit 210 or another system module (208) such as an automatic crash notification module or the like provided an electrical indication within or to the telematics unit 210—e.g., indicating a vehicle crash or collision—the gain offset value may be set to zero (0), at least temporarily. In this manner, the high gain antenna could be used to improve the opportunity to connect to the wireless carrier system 204, 206 during an emergency situation or mode.

According to another embodiment, the gain offset $O_{ANT}$ value may be set to zero in at least some instances of LTE DRx mode operation. For example, in at least some scenarios, it may be desirable to not use method 300 in order to avoid excessive PLMN searching—e.g., when the vehicle 202 is without coverage (e.g., a so-called coverage hole). In this manner, the telematics unit 210 may minimize undesirable power consumption during DRx mode, during the vehicle ignition off.

Thus, there has been described methods of cell selection and reselection using a vehicle telematics unit and a vehicle antenna having high gain characteristics. 3GPP selection and/or reselection techniques may be employed using a determined gain offset that corresponds to the vehicle antenna. In at least some embodiments, the determination to select/reselect may be based on both signal power values and signal quality values. In at least one embodiment, one or more non-3GPP thresholds may be employed (e.g., TH1 and TH1+Δ). Further, embodiments exist which may temporarily disable use of the high antenna gain offset.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of cell reselection using vehicle telematics unit coupled to a vehicle antenna, comprising the steps of:
    performing a measurement of a reference signal from a serving cell that is connected to the telematics unit;
    determining whether to perform a measurement of a target cell based on both a serving cell signal strength value (Srxlev) and a measured serving cell signal quality value (Qqualmeas);
    when the measurement of the target cell is performed, then determining, based on cell selection values of the serving and target cells, whether to reselect to the target cell; and
    determining a vehicle high gain antenna offset ($O_{ANT}$) based on the reference signal, wherein the offset ($O_{ANT}$) is applied during the determination of whether to reselect to the target cell.

2. The method of claim 1, wherein the offset ($O_{ANT}$) is associated with the vehicle antenna being mounted a vehicle rooftop.

3. The method of claim 1, wherein the offset ($O_{ANT}$) is subtracted from the serving cell signal strength value (Srxlev) when the measured serving cell signal quality value (Qqualmeas) is less than a threshold (TH1).

4. The method of claim 3, wherein the threshold is a non-3GPP threshold.

5. The method of claim 1, wherein, when the offset ($O_{ANT}$) is applied to the serving cell signal strength value (Srxlev), it is also applied to a target cell signal strength value (Srxlev).

6. The method of claim 1, wherein, when the offset ($O_{ANT}$) is not applied to the serving cell signal strength value (Srxlev), it is also not applied to a target cell signal strength value (Srxlev) when the target cell is of equal or lower priority.

7. The method of claim 1, wherein, when the offset ($O_{ANT}$) is not applied to the serving cell signal strength value (Srxlev), it is also not applied to a target cell signal strength value (Srxlev) when the target cell is of higher priority but a measured target cell signal quality value (Qqualmeas) is greater than or equal to a sum of a threshold (TH1) plus a delta (Δ) value.

8. The method of claim 1, wherein, when the offset ($O_{ANT}$) is not applied to the serving cell signal strength value (Srxlev), it is applied to a target cell signal strength value (Srxlev) when the target cell is of higher priority and a measured target cell signal quality value (Qqualmeas) is less than a sum of a threshold (TH1) plus a delta (Δ) value.

* * * * *